(12) United States Patent
Cohen et al.

(10) Patent No.: US 12,242,737 B1
(45) Date of Patent: Mar. 4, 2025

(54) DATA STORAGE DEVICE AND METHOD FOR ACCIDENT-MODE STORAGE OF VEHICLE INFORMATION

(71) Applicant: Western Digital Technologies, Inc., San Jose, CA (US)

(72) Inventors: Nisiel Cohen, Rosh Haain (IL); Orel Kahlon, Netanya (IL); Roi Jazcilevich, Givatayim (IL); Aki Bleyer, Even Yehuda (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/434,976

(22) Filed: Feb. 7, 2024

(51) Int. Cl.
  *G06F 3/06* (2006.01)

(52) U.S. Cl.
  CPC .......... *G06F 3/0619* (2013.01); *G06F 3/0622* (2013.01); *G06F 3/0647* (2013.01); *G06F 3/0688* (2013.01)

(58) Field of Classification Search
  CPC ..... G06F 3/0619; G06F 3/0622; G06F 3/0647
  See application file for complete search history.

(56) References Cited

U.S. PATENT DOCUMENTS

| | | | |
|---|---|---|---|
| 6,950,013 B2 | 9/2005 | Scaman et al. | |
| 7,974,808 B2 | 7/2011 | Smith et al. | |
| 8,620,518 B2 | 12/2013 | Bradley et al. | |
| 2002/0105438 A1 | 8/2002 | Forbes et al. | |
| 2012/0303215 A1 | 11/2012 | Kim et al. | |
| 2022/0050625 A1* | 2/2022 | Muchherla | G06F 3/0644 |
| 2022/0350494 A1* | 11/2022 | Wu | G06F 3/0679 |
| 2023/0153022 A1* | 5/2023 | Lee | G06F 3/0679 |
| | | | 711/154 |

* cited by examiner

*Primary Examiner* — Jason W Blust
(74) *Attorney, Agent, or Firm* — Crowell & Moring LLP (57) ABSTRACT

A data storage device and method for accident-mode storage of vehicle information are disclosed. In one embodiment, a data storage device is provided comprising a memory and one or more processors. The memory comprises single-level cell (SLC) memory and multi-level cell (MLC) memory. The one or more processors, individually or in combination, are configured to: receive a command from a vehicle to enter accident mode; and in response to receiving the command from the vehicle to enter accident mode, relocate vehicle information stored in the MLC memory to the SLC memory. Other embodiments are disclosed.

20 Claims, 6 Drawing Sheets

DATA STORAGE DEVICE AND METHOD FOR ACCIDENT-MODE STORAGE OF VEHICLE INFORMATION

BACKGROUND

A data storage device can be used in a vehicle to store various vehicle information, such as, for example, vehicle speed, video from a camera on the vehicle, etc. If the vehicle is involved in an accident, it may be desired to retrieve the vehicle information from the data storage device for analysis to help understand events that occurred before, during, and/or after the accident.

DETAILED DESCRIPTION

The following embodiments generally relate to a data storage device and method for accident-mode storage of vehicle information. In one embodiment, a data storage device is provided comprising a memory and one or more processors. The memory comprises single-level cell (SLC) memory and multi-level cell (MLC) memory. The one or more processors, individually or in combination, are configured to: receive a command from a vehicle to enter accident mode; and in response to receiving the command from the vehicle to enter accident mode, relocate vehicle information stored in the MLC memory to the SLC memory.

In some embodiments, the one or more processors, individually or in combination, are further configured to: prevent the vehicle information from being relocated back to the MLC memory until a command is received from the vehicle to exit accident mode.

In some embodiments, the one or more processors, individually or in combination, are further configured to: write-protect the vehicle information after the vehicle information is relocated to the SLC memory.

In some embodiments, the vehicle information is relocated to the SLC memory using a write trim that is more resilient to high temperatures than a write trim used when the data storage device is not in accident mode.

In some embodiments, the vehicle information is identified by a logical block address (LBA) range received from the vehicle.

In some embodiments, the one or more processors, individually or in combination, are further configured to: store, in the SLC memory, additional vehicle information that is outside of the LBA range; and prevent the additional vehicle information from being relocated the MLC memory until a command is received from the vehicle to exit accident mode.

In some embodiments, relocation of the vehicle information from the MLC memory to the SLC memory is given priority over other operations.

In some embodiments, the one or more processors, individually or in combination, are further configured to: receive a command from the vehicle to exit accident mode; and in response to receiving the command from the vehicle to exit accident mode, fold the vehicle information stored in the SLC memory into the MLC memory.

In some embodiments, the vehicle information comprises vehicle speed, vehicle steering angle, vehicle tire pressure, vehicle braking activity, vehicle engine/motor activity, a sound recording captured by a vehicle microphone, an image captured by a vehicle camera, a video captured by a vehicle camera, a geographic location of the vehicle, and/or data derived from a geographic location of the vehicle.

In some embodiments, the memory comprises a three-dimensional memory.

In another embodiment, a method is provided that is performed in a data storage device comprising a memory comprising a single-level cell (SLC) area and a multi-level cell (MLC) area. The method comprises: receiving an accident notification from a vehicle; and in response to receiving the accident notification from the vehicle: creating free space in the SLC area by erasing previously-written data in the SLC area; and writing vehicle information in the free space created in the SLC area, wherein the vehicle information is not folded into the MLC area until after the accident notification is cleared.

In some embodiments, the method further comprises: receiving a command to clear the accident notification; and in response to receiving the command to clear the accident notification, folding the vehicle information into the MLC area.

In some embodiments, the method further comprises: write-protecting the vehicle information.

In some embodiments, the vehicle information is written in the free space in the SLC area using a write trim that is more resilient to high temperatures than a write trim used before the data storage device received the accident notification from the vehicle.

In some embodiments, the vehicle information is identified by a logical block address (LBA) range received from the vehicle.

In some embodiments, the method further comprises: storing, in the SLC area, additional vehicle information that is outside of the LBA range, wherein the additional vehicle information is not folded into the MLC area until after the accident notification is cleared.

In some embodiments, creating free space and writing the vehicle information are given priority over other operations.

In some embodiments, the vehicle information comprises vehicle speed, vehicle steering angle, vehicle tire pressure, vehicle braking activity, vehicle engine/motor activity, a sound recording captured by a vehicle microphone, an image captured by a vehicle camera, a video captured by a vehicle camera, a geographic location of the vehicle, and/or data derived from a geographic location of the vehicle.

In some embodiments, the memory comprises a three-dimensional memory.

In another embodiment, a data storage device is provided comprising: single-level cell (SLC) memory; multi-level cell (MLC) memory; and means for storing vehicle information received from a vehicle in the SLC memory instead of in the MLC memory in response to receiving an accident prediction from the vehicle.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
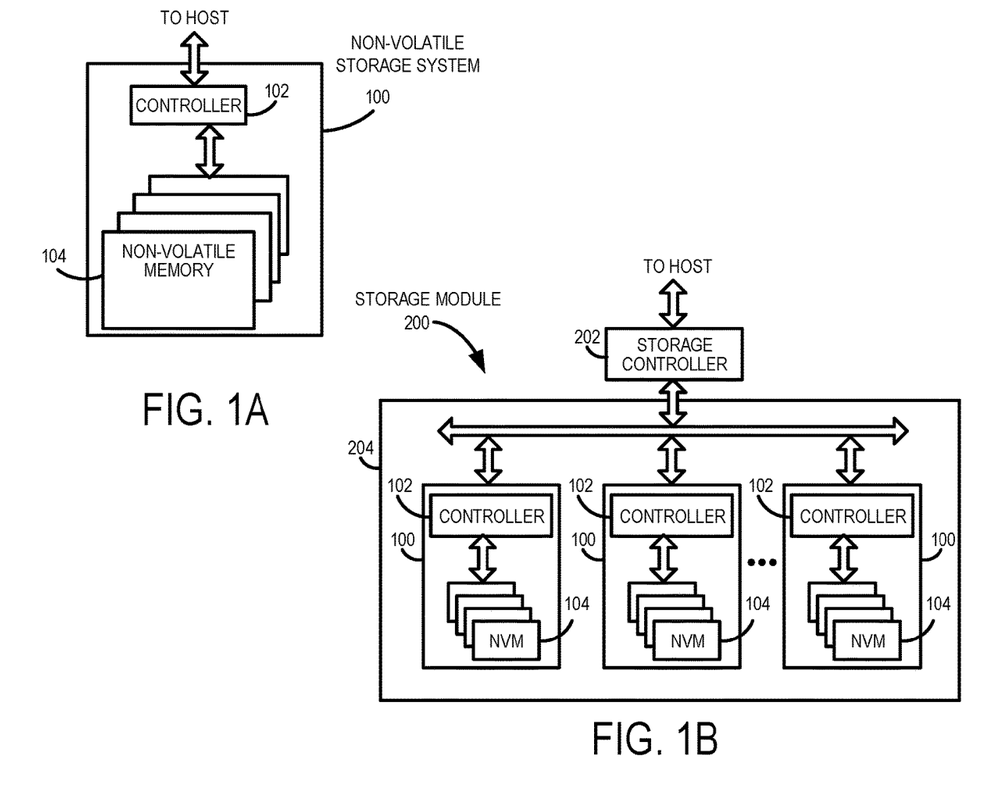
FIG. 1A is a block diagram of a data storage device of an embodiment.
FIG. 1B is a block diagram illustrating a storage module of an embodiment.
Figure 1C:
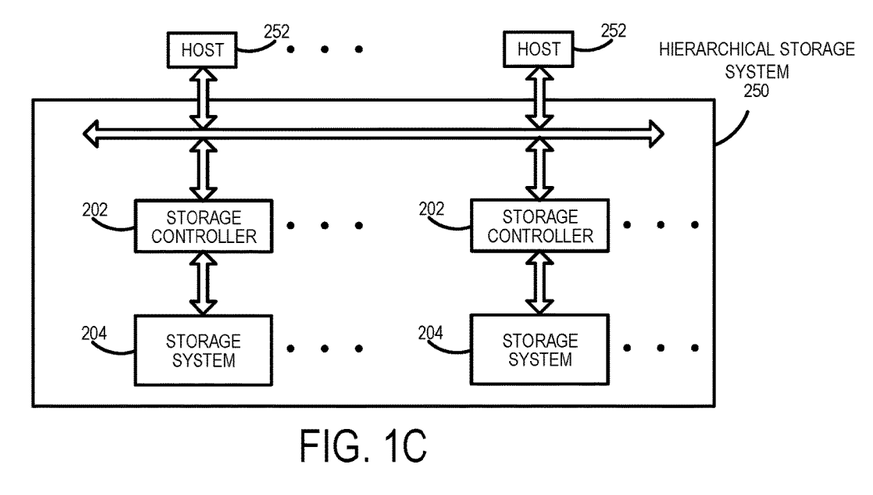
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
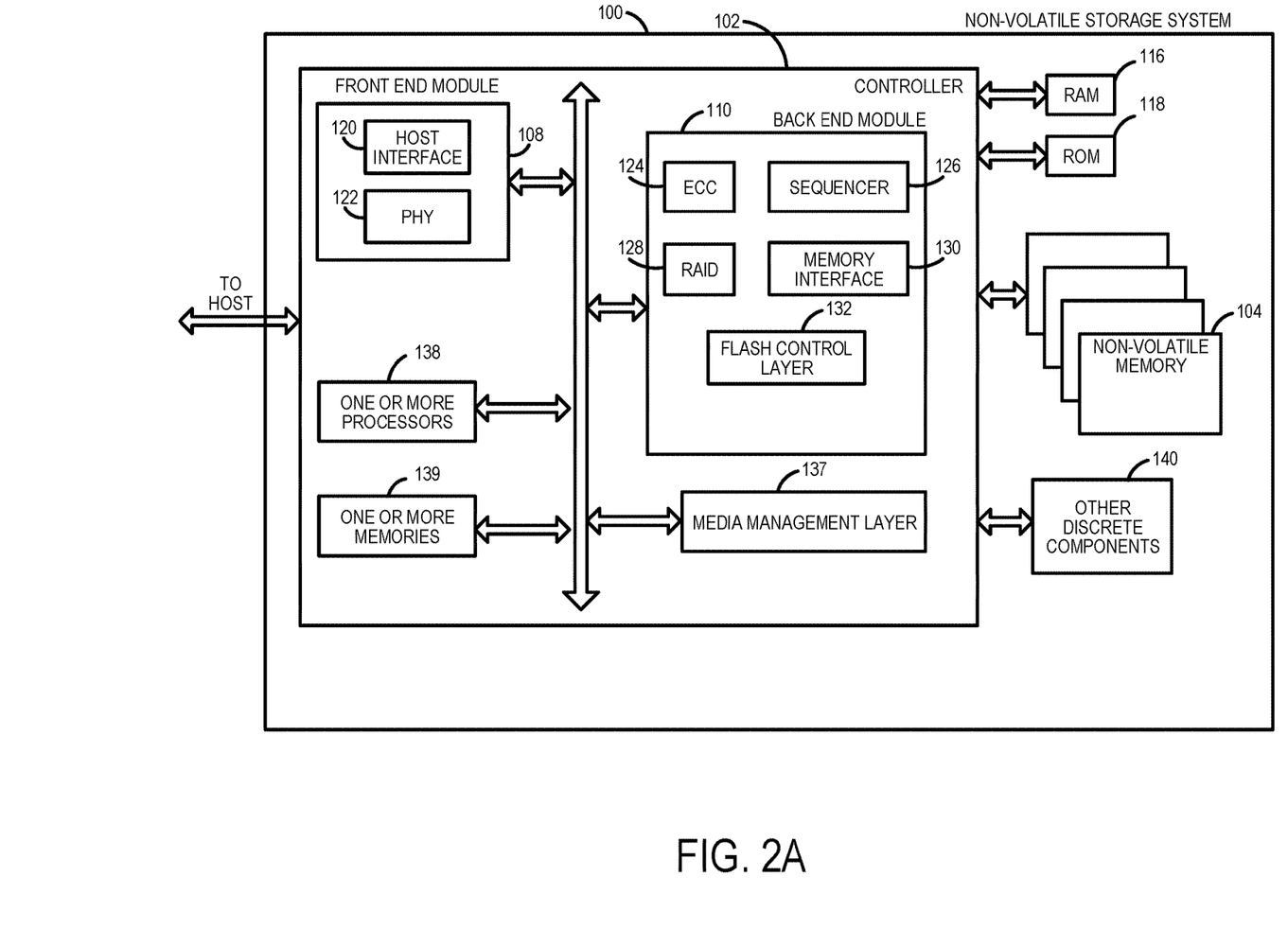
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
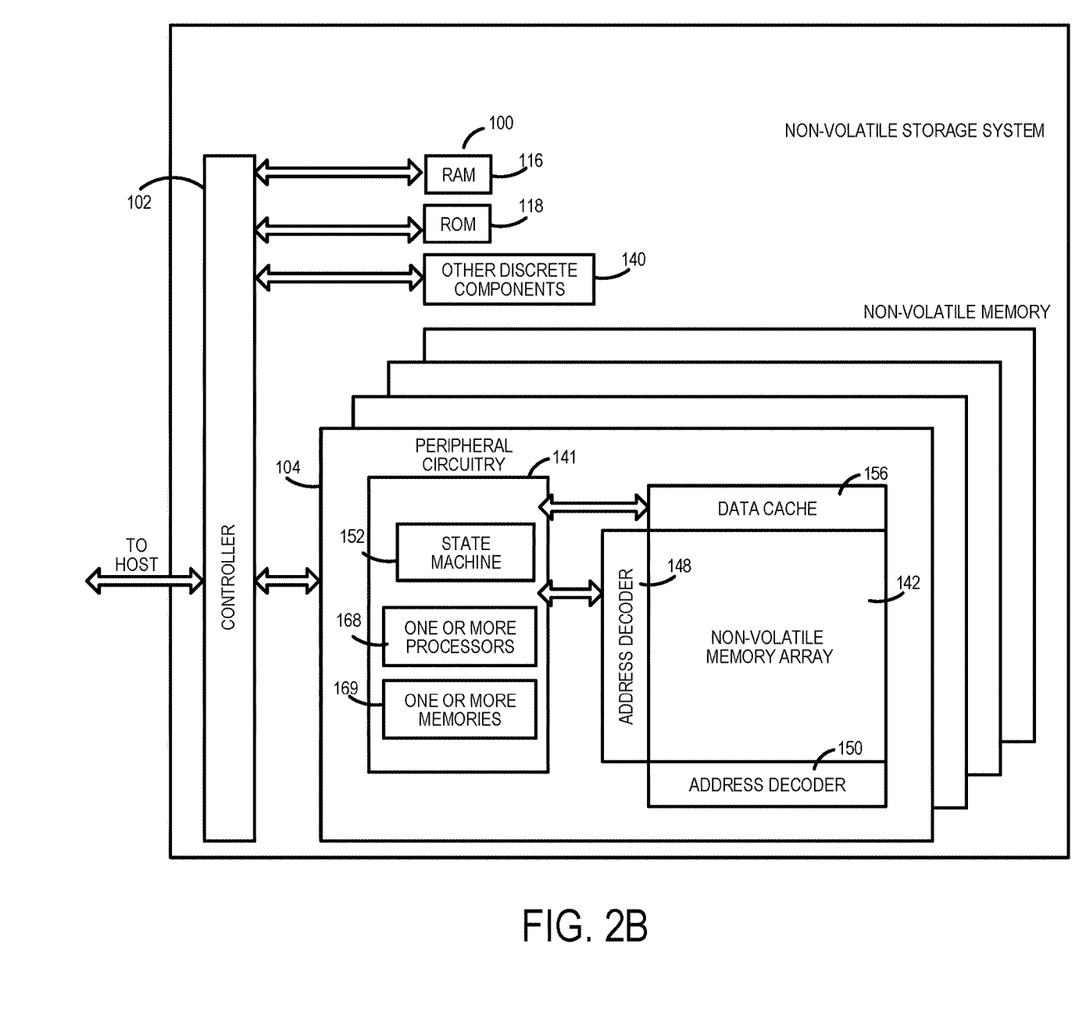
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
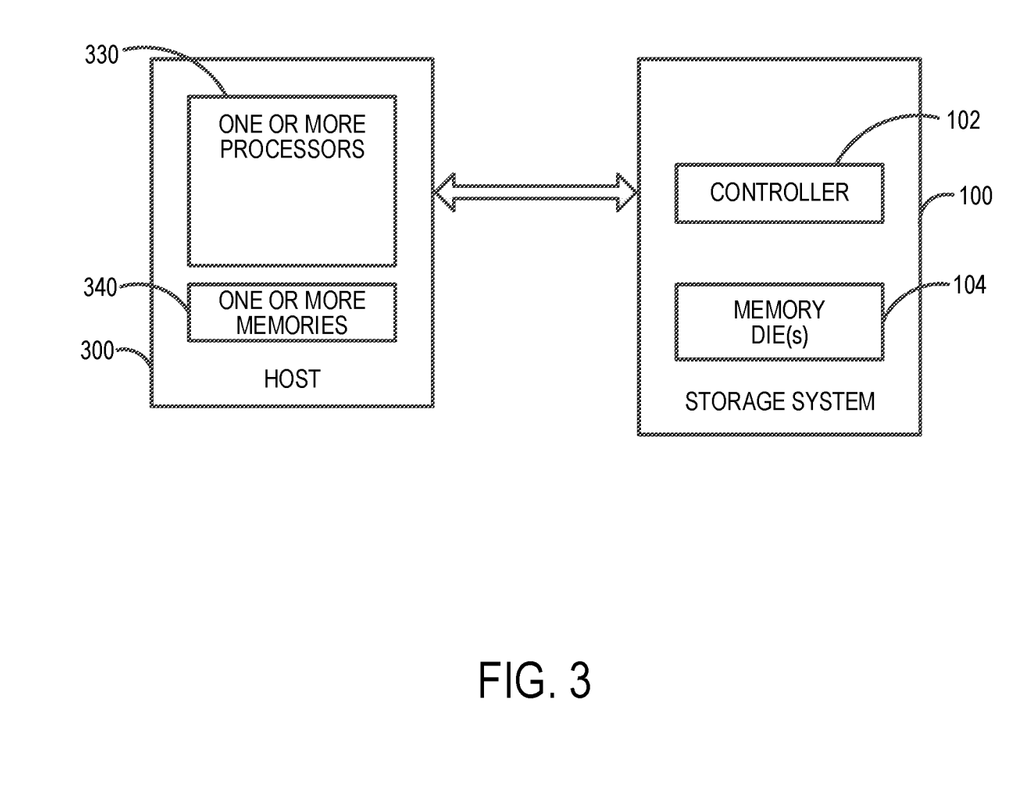
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can be used in a vehicle (e.g., a car, a truck, a bus, a train, an airplane, a boat, a motorcycle, a scooter, etc.) to store various vehicle information. As used herein, "vehicle information" can refer to any information that is generated by a component in or on the vehicle and/or information that relates to the vehicle but is generated by a component external to the vehicle. Examples of such "vehicle information" include, but are not limited to, speed (e.g., generated by a speed sensor in the vehicle), steering angle position or movement (e.g., generated by a steering angle sensor in the vehicle), tire pressure (e.g., generated by a tire pressure sensor in the vehicle), braking activity (e.g., generated by a brake pedal sensor in the vehicle and/or a braking controller in the vehicle), engine/motor activity (e.g., generated by an engine/motor sensor/controller in the vehicle), a sound recording (e.g., generated by a microphone internal to and/or external to the vehicle), distance information to another vehicle (e.g., using radar, ultrasound, etc.), an image and/or video recording (e.g., generated by a camera mounted internal to and/or external to the vehicle, whose field of view is internal to and/or external to the vehicle), and/or geographic location (e.g., global positioning system (GPS) coordinates) with optional derivative data (e.g., speed, velocity, etc. based on various geographic location data points). As can be seen from these examples, "vehicle information" can relate to a state of the vehicle (e.g., speed, steering angle, etc.) and/or can relate to events external to or internal to the vehicle but not necessarily about the vehicle itself (e.g., video footage of the road, video footage of the driver of the vehicle, etc.).

If the vehicle is involved in an accident, it may be desired to retrieve the vehicle information from the data storage device for analysis to help understand events that occurred before, during, and/or after the accident. For example, if the vehicle is an automobile, it may be helpful to know how fast the automobile was going prior to the accident, when and how rapidly the brake pedal was pressed, whether the automobile was swerving, whether image or video data of the driver shows that the driver was asleep or impaired, whether image or video data shows how long the collision object was in view, etc. In this way, the data storage device in the automobile can be considered similar to a "black box" on an airplane.

The data storage device can be configured to store the vehicle information in any suitable way. For example, vehicle information (e.g., from pre-defined critical functions) can be stored in a loop (similar to a surveillance system), where the vehicle information is stored for a period of time (e.g., 30 seconds, a few minutes, day(s), etc.) and then is overwritten with new data when it arrives (e.g., in a first-in-first-out (FIFO) manner). In this example, the data storage device acts as a circular buffer, storing vehicle information that was generated during the specified period of time prior to the accident. In other examples, the data storage device can also store vehicle information generated during and/or after the accident, as such information may be helpful in accident analysis (or in other contexts, such as a carjacking or surveillance of external events (e.g., a criminal activity occurring near, but not involving, the vehicle)).

Since the vehicle information may be important data, it may be desired to protect the vehicle information in the memory of the data storage device, so that it can be reliably retrieved post-accident. However, there may be several reliability challenges present. For example, if the accident creates heat, the heat can cause loss of the vehicle information in the memory. As another example, it may take a relatively-long time after the accident for the vehicle information to be retrieved from the data storage device (e.g., due to the vehicle sitting for a long time in a crashed-car parking lot). The memory in the data storage device may not be able to reliably store the vehicle information for a long time, especially if there are other adverse condition, such as heat. These problems can be exacerbated when the vehicle information is stored in a multi-level cell (MLC) area in the memory, as MLC memory is typically less reliable than single-level cell (SLC) memory.

The following embodiments can be used to address this reliability problem. In one embodiment, the vehicle (which will be referred to as the host 300 in these examples) is configured to predict an upcoming accident (e.g., by interpreting various vehicle information, etc.) and send a notification of such to the data storage device 100. In response to receiving the notification, the controller 102 in the data storage device 100 can store subsequently-received data in an SLC area (e.g., partition) in the memory 104 instead of in an MLC area (e.g., partition), as data is typically stored more reliably in SLC memory than in MLC memory. Optionally, the controller 102 can store the data with a write trim that is more resilient to high temperatures (e.g., a "special reliable write trim").

As another example, the notification can be an identification of a logical block address (LBA) range for data that is deemed relevant (e.g., critical) for accident analysis and, as such, is desired to be stored with relatively-high reliability for analysis in case the predicted accident occurs. In this example, the controller 102 in the data storage device 100 receives data from the host 300 and stores it in an allocated LBA range in a SLC partition (and, optionally, with a special reliable trim that will be more resilient to high temperatures).

Also, the controller 102 can be configured to relocate critical data from MLC partitions to the specially-allocated LBA range in the SLC partition. In such case, the relocation can get priority over other operations. In addition, the controller 102 can mark the data as "do not relocate to MLC" until the host 300 releases the accident mode or until it is re-written (the specially-allocated LBA range can be marked as write protected). Also, to protect the predicted accident data, the next set of data received can also be written to SLC memory (as enforced by counters) and can also be marked as "do not relocate to MLC."

In the event that the host's prediction of an impending accident was incorrect, the host 300 can provide the data storage device 100 with a message that the accident was avoided, and the data storage device 100 can exit the accident mode. In exiting accident mode, the controller 102 can fold SLC data to MLC and continue normal mode operations. However, in case the accident did occur, the above embodiments can help ensure that critical vehicle data is stored with relatively-higher reliability and with better chances of surviving high temperature and longer retention periods in car-crashed parking lots. Helping protect such data can assist in analyzing issues post-accident and understand safety issue.

Figure 4:
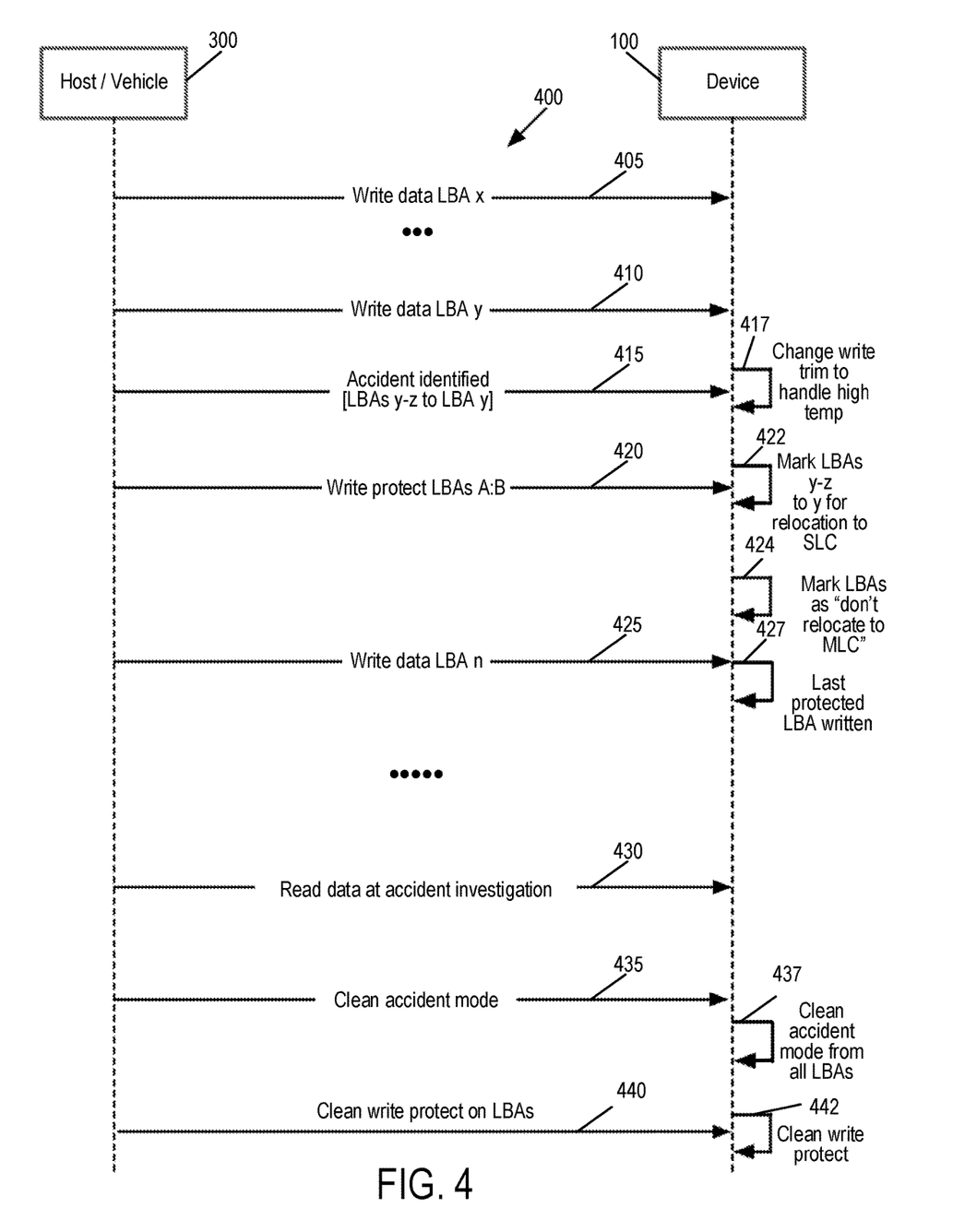
FIG. 4 is a flow chart of an accident-mode storage method of an embodiment.

Turning again to the drawings, FIG. 4 is a flow chart 400 that illustrates this embodiment. In this example, the host 300 is a vehicle, such as a car. As shown in FIG. 4, the host 300 sends a command to the data storage device 100 to write data LBA x . . . LBA y (acts 405 and 410). When the host 300 identifies that the vehicle may be involved in an accident, the host 300 informs the data storage device 100 that LBAs y-z to LBA y are affected (act 415). This cause the data storage device 100 to go into accident mode. In this example, accident mode causes the controller 102 in the data storage device 100 to change the write trim to handle high temperatures (act 417). Further, when the host 300 sends a command to the data storage device 100 to write protect LBAs A; B (act 420), the controller 102 in the storage device 100 responds by marking LBAs y-z to LBA y for relocation from MLC memory to SLC memory (act 422) and to further mark those LBAs as "do not relocate to MLC," so the data in those blocks is not moved back to MLC memory (act 424). When the host 300 sends a command to the data storage device 100 to write data LBA n (act 425), the controller 102 in the data storage device 100 writes the data as the last LBA written to SLC using the special trim and with "do not relocation to MLC" marked (act 427).

At some point later, the host 300 (or another entity) sends a command to the data storage device 100 to read the protected data (act 430). After the protected data is read, the host 300 (or another entity) can send a command to the data storage device 100 to clear accident mode (act 435). In response to that command, the controller 102 in the data storage device 100 can clear the accident mode from all the LBAs in the memory 104 (act 437). Then, the host 300 (or another entity) can send a command to the data storage device 100 to clear write protect on LBAs (act 440), which the controller 102 executes (act 442).

As noted above, many embodiments can be used. For example, some storage devices store data only in an SLC memory area. With such data storage devices, saved data can be divided to parts of, say, 30 seconds. In case of an accident, the host can decide to keep the data and not overwrite it. So, in this example, no special trigger is used to retain data. The benefit of this approach is that data is always stored in an SLC memory area and is more resilient (e.g., an SLC block can have a program-erase count (PEC) that is thirty-times more than the PEC of an MLC block).

In another embodiment, the host 300 is configured to identify an emergency accident condition and send a notification to the data storage device 100. A benefit of this embodiment is that the memory 104 is used as MLC in most cases, and the data stays in SLC when the data should be saved for analysis. In one example, data has a size of at least two "parts." In case of an accident, the host 300 can send a notification to store the current part in SLC memory and not relocate it to MLC memory. As such, the data stored in SLC memory is protected until it is re-written or erased. In parallel, the host 300 can erase two old parts to free SLC space for data storage. In one example, those parts (or LBA range) are not written again until the protected part is erased or re-written. The above can be done several times. A typical case can be to save the pre-accident part and the post-accident part. There may be a limit to this process, driven from the ratio of SLC and MLC memory area. So, once the stored vehicle information is retrieved, the host 300 can release the accident parts or send a specific command to the data storage device 100 to release all the parts.

Figure 5:
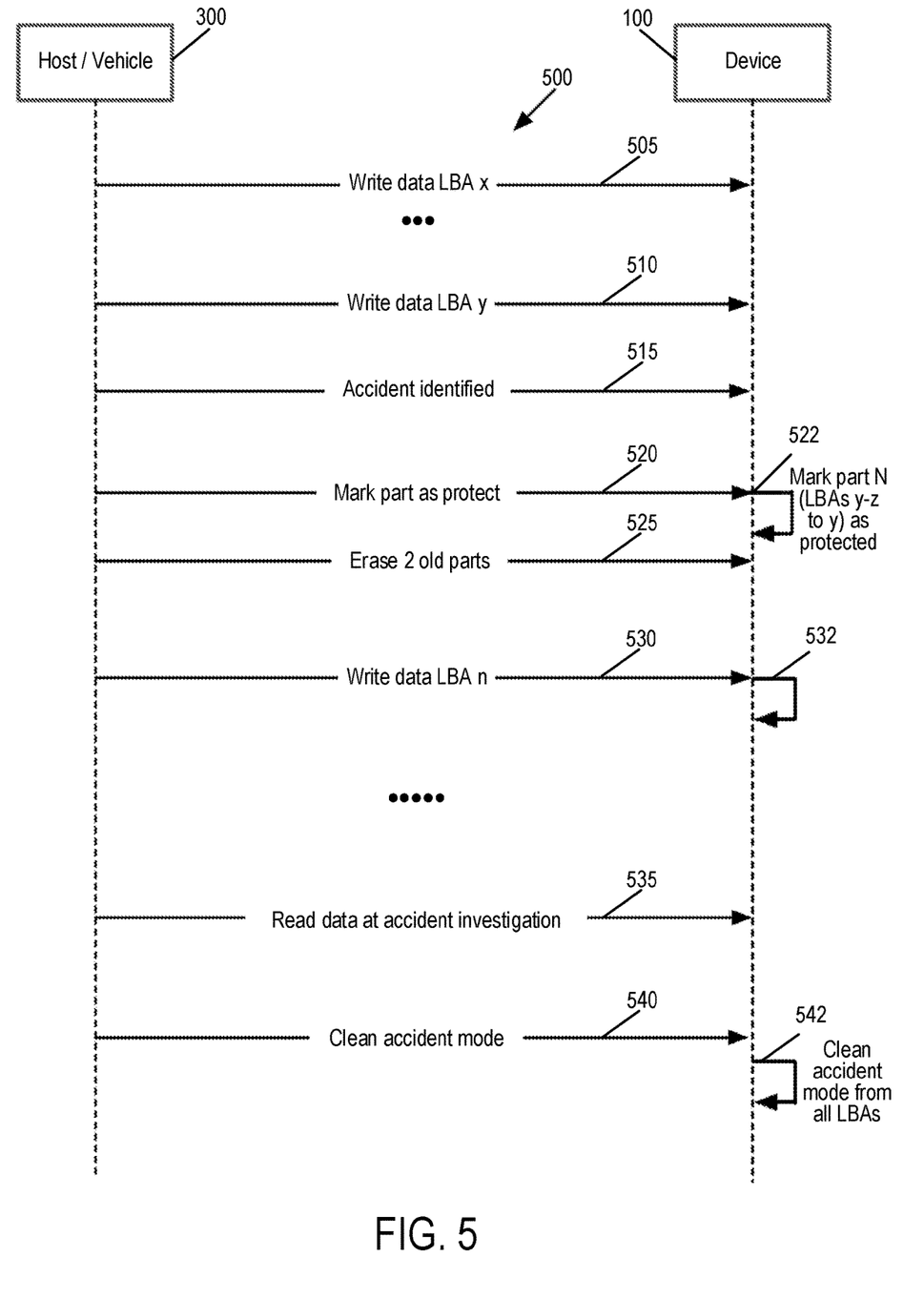
FIG. 5 is a flow chart of an accident-mode storage method of another embodiment.

Turning again to the drawings, FIG. 5 is a flow chart 500 that illustrates this embodiment. In this example, the host 300 is a vehicle, such as a car. As shown in FIG. 5, the host 300 sends a command to the data storage device 100 to write data LBA x . . . LBA y (acts 505 and 510). When the host 300 identifies that the vehicle was involved in an accident, the host 300 informs the data storage device (act 515). Next, the host 300 marks the part of the data it wants to protect (act 520). In response, the controller 102 of the data storage device 100 enters accident mode by marking part N (which is LBAs y-z to y) as protected (act 522). The host 300 then sends a command to the data storage device 100 to erase a set of one or more (here, two) old parts (act 525). After that, the host 300 continues to send commands to write data to the data storage device 100 (act 530), which the controller 102 in the data storage device 100 executes (act 532).

At some point later, the host 300 (or another entity) sends a command to the data storage device 100 to read the protected data (act 535). After the protected data is read, the host 300 (or another entity) can send a command to the data storage device 100 to clear accident mode (act 540). In response to that command, the controller 102 in the data storage device 100 can clear the accident mode from all the LBAs in the memory 104 (act 542).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory comprising single-level cell (SLC) memory and multi-level cell (MLC) memory; and
   one or more processors, individually or in combination, configured to:
   receive a command from a vehicle to enter accident mode; and
   in response to receiving the command from the vehicle to enter accident mode, relocate vehicle information stored in the MLC memory to the SLC memory.

2. The data storage device of claim 1, wherein the one or more processors, individually or in combination, are further configured to:
   prevent the vehicle information from being relocated back to the MLC memory until a command is received from the vehicle to exit accident mode.

3. The data storage device of claim 1, wherein the one or more processors, individually or in combination, are further configured to:
   write-protect the vehicle information after the vehicle information is relocated to the SLC memory.

4. The data storage device of claim 1, wherein the vehicle information is relocated to the SLC memory using a write trim that is more resilient to high temperatures than a write trim used when the data storage device is not in accident mode.

5. The data storage device of claim 1, wherein the vehicle information is identified by a logical block address (LBA) range received from the vehicle.

6. The data storage device of claim 5, wherein the one or more processors, individually or in combination, are further configured to:
- store, in the SLC memory, additional vehicle information that is outside of the LBA range; and
- prevent the additional vehicle information from being relocated the MLC memory until a command is received from the vehicle to exit accident mode.

7. The data storage device of claim 1, wherein relocation of the vehicle information from the MLC memory to the SLC memory is given priority over other operations.

8. The data storage device of claim 1, wherein the one or more processors, individually or in combination, are further configured to:
- receive a command from the vehicle to exit accident mode; and
- in response to receiving the command from the vehicle to exit accident mode, fold the vehicle information stored in the SLC memory into the MLC memory.

9. The data storage device of claim 1, wherein the vehicle information comprises vehicle speed, vehicle steering angle, vehicle tire pressure, vehicle braking activity, vehicle engine/motor activity, a sound recording captured by a vehicle microphone, an image captured by a vehicle camera, a video captured by a vehicle camera, a geographic location of the vehicle, and/or data derived from a geographic location of the vehicle.

10. The data storage device of claim 1, wherein the memory comprises a three-dimensional memory.

11. A method comprising:
- performing in a data storage device comprising a memory comprising a single-level cell (SLC) area and a multi-level cell (MLC) area:
  - receiving an accident notification from a vehicle; and
  - in response to receiving the accident notification from the vehicle:
    - creating free space in the SLC area by erasing previously-written data in the SLC area; and
    - writing vehicle information in the free space created in the SLC area, wherein the vehicle information is not folded into the MLC area until after the accident notification is cleared.

12. The method of claim 11, further comprising:
- receiving a command to clear the accident notification; and
- in response to receiving the command to clear the accident notification, folding the vehicle information into the MLC area.

13. The method of claim 11, further comprising write-protecting the vehicle information.

14. The method of claim 11, wherein the vehicle information is written in the free space in the SLC area using a write trim that is more resilient to high temperatures than a write trim used before the data storage device received the accident notification from the vehicle.

15. The method of claim 11, wherein the vehicle information is identified by a logical block address (LBA) range received from the vehicle.

16. The method of claim 15, further comprising storing, in the SLC area, additional vehicle information that is outside of the LBA range, wherein the additional vehicle information is not folded into the MLC area until after the accident notification is cleared.

17. The method of claim 11, wherein creating free space and writing the vehicle information are given priority over other operations.

18. The method of claim 11, wherein the vehicle information comprises vehicle speed, vehicle steering angle, vehicle tire pressure, vehicle braking activity, vehicle engine/motor activity, a sound recording captured by a vehicle microphone, an image captured by a vehicle camera, a video captured by a vehicle camera, a geographic location of the vehicle, and/or data derived from a geographic location of the vehicle.

19. The method of claim 11, wherein the memory comprises a three-dimensional memory.

20. A data storage device comprising:
- single-level cell (SLC) memory;
- multi-level cell (MLC) memory; and
- means for:
  - receiving a command from a vehicle to enter accident mode; and
  - relocating vehicle information stored in the MLC memory to the SLC memory in response to receiving the command from the vehicle to enter accident mode.

* * * * *